United States Patent [19]
Kawada

[11] Patent Number: 5,648,993
[45] Date of Patent: Jul. 15, 1997

[54] METHOD AND APPARATUS FOR SYNCHRONIZING MODEM TRANSMISSION BY CONTROLLING A MEASURED PHASE DIFFERENCE BETWEEN AN INTERNAL TIMING SIGNAL AND A TRANSMISSION TIMING SIGNAL

[75] Inventor: Noboru Kawada, Kawasaki, Japan

[73] Assignee: Fujitsu Limited, Kawasaki, Japan

[21] Appl. No.: 160,917

[22] Filed: Dec. 3, 1993

[30] Foreign Application Priority Data

Dec. 16, 1992 [JP] Japan ..................... 4-334835

[51] Int. Cl.$^6$ ............................................ H04L 7/04
[52] U.S. Cl. .................. 375/357; 375/222; 327/141
[58] Field of Search ...................... 375/373, 220, 375/222, 374, 375, 362, 356, 357, 219, 369, 370, 371, 363, 355, 359, 360; 327/141; 340/684, 825.14, 825.2; 364/945.9; 370/100.1, 105.3; 371/5.4, 42, 47.1; 380/48; 455/265; 395/550

[56] References Cited

U.S. PATENT DOCUMENTS

| | | | |
|---|---|---|---|
| 3,747,074 | 7/1973 | Schulze | 340/172.5 |
| 4,280,099 | 7/1981 | Rattlingourd | 327/160 |
| 4,780,891 | 10/1988 | Guerin et al. | 375/362 |
| 4,817,114 | 3/1989 | Boer et al. | 375/222 |
| 4,849,997 | 7/1989 | Suzuki et al. | 375/371 |
| 5,052,024 | 9/1991 | Moran, III et al. | 375/219 |
| 5,131,015 | 7/1992 | Benjaram et al. | 375/377 |
| 5,173,617 | 12/1992 | Alsup et al. | 327/158 |
| 5,245,637 | 9/1993 | Gersbach et al. | 375/374 |
| 5,285,483 | 2/1994 | Ogawa et al. | 375/376 |

FOREIGN PATENT DOCUMENTS

| | | |
|---|---|---|
| 0 271 218 | 6/1988 | European Pat. Off. . |
| 2 183 128 | 5/1987 | United Kingdom . |

OTHER PUBLICATIONS

"Rapid Communications," C. D. Ridley et al., Journal of Physics E. Scientific Instruments, vol. 19, No. 1, Jan. 1986, Bristol, pp. 83–85.

*Primary Examiner*—Wellington Chin
*Assistant Examiner*—William Luther
*Attorney, Agent, or Firm*—Staas & Halsey

[57] ABSTRACT

A transmission synchronizing apparatus and method of a modem, in which a phase difference from a change point of an internal timing signal to a change point of a transmission timing signal is detected as a reference phase difference at the time of pull-in, based on a request to transmit from an external device. After pull-in, in a stationary communicating state, a phase difference is obtained from a change point of the internal timing signal to a change point of the transmission timing signal as a measured phase difference. The measured phase difference is controlled to coincide with the reference phase difference.

13 Claims, 11 Drawing Sheets

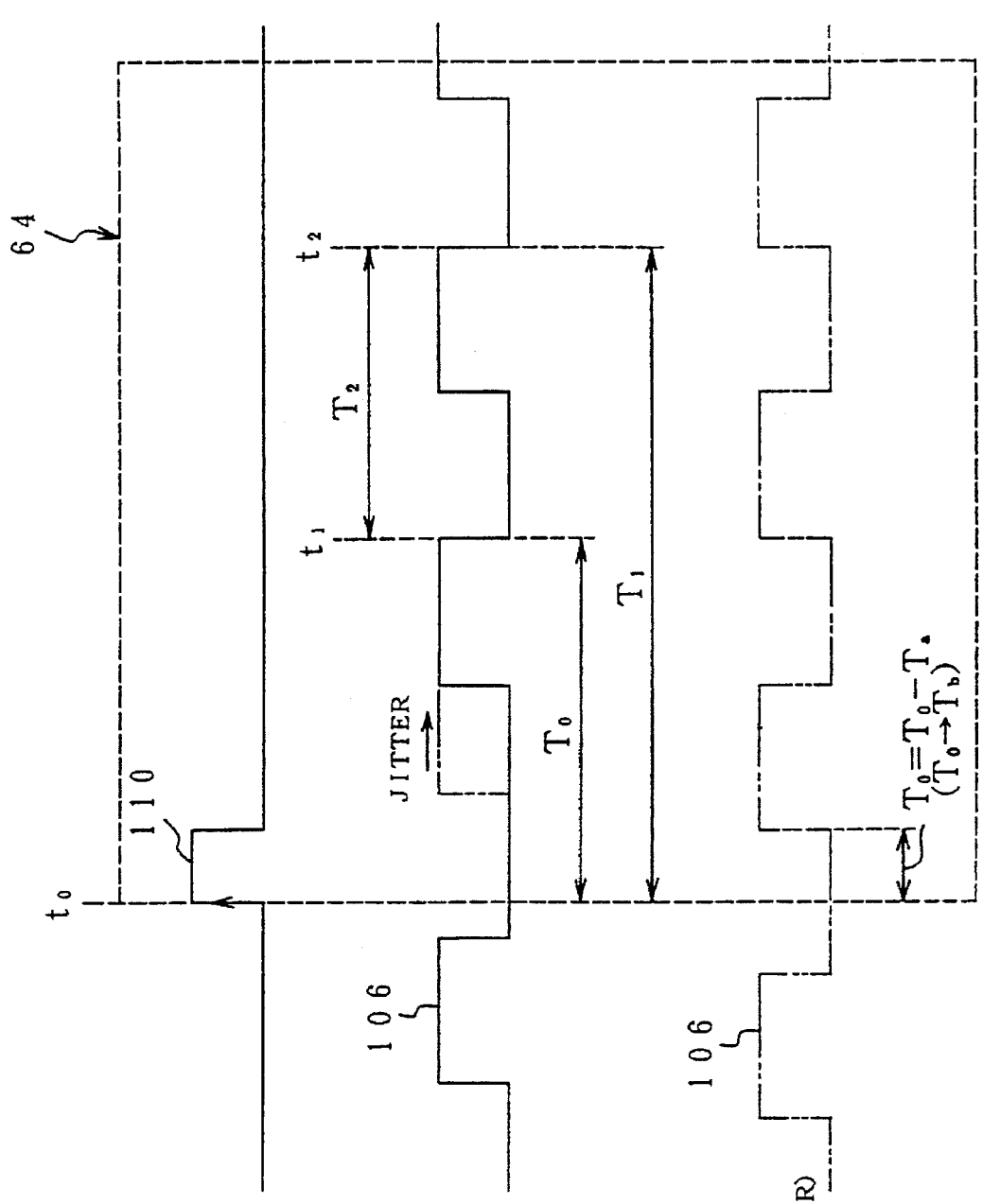

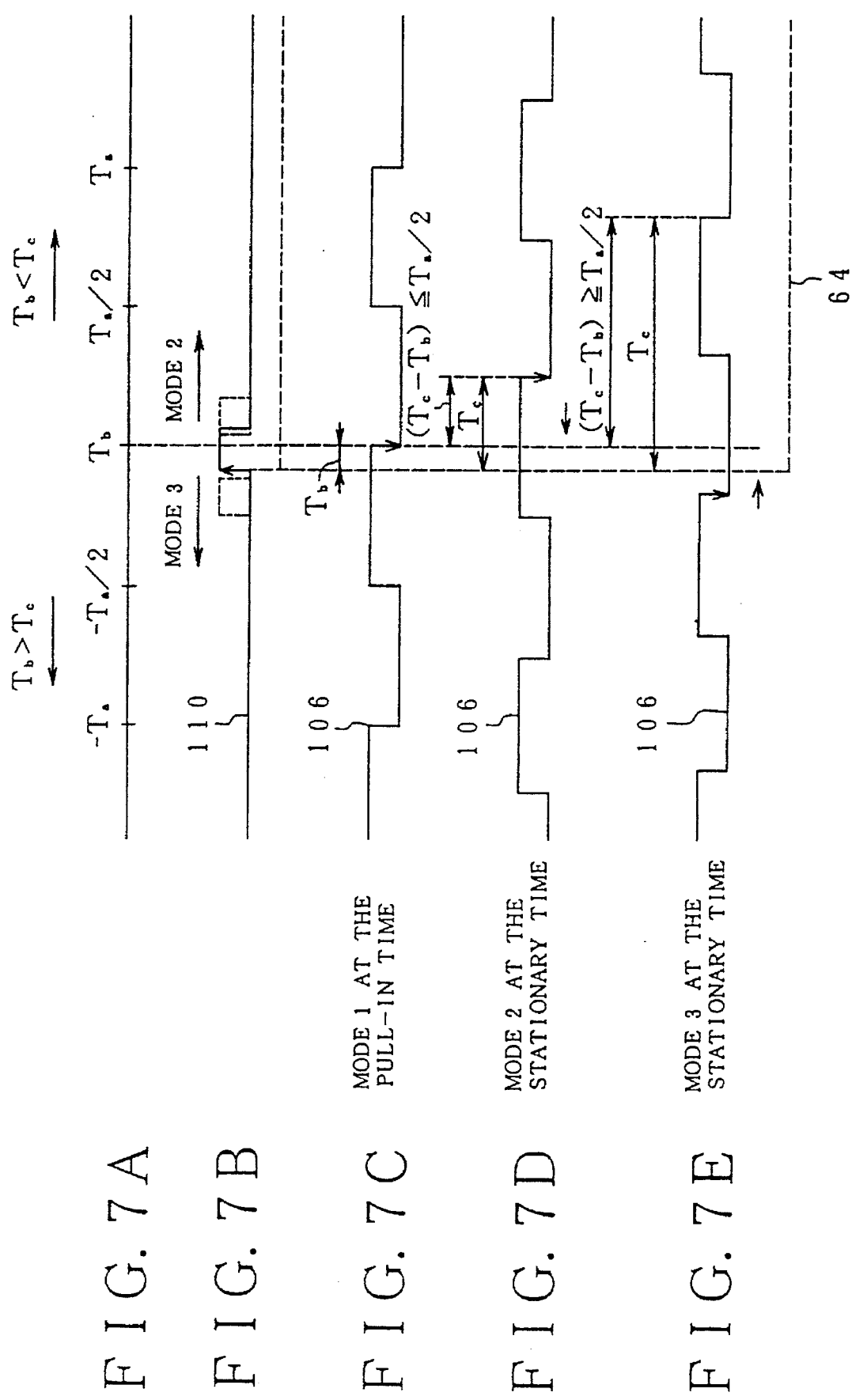

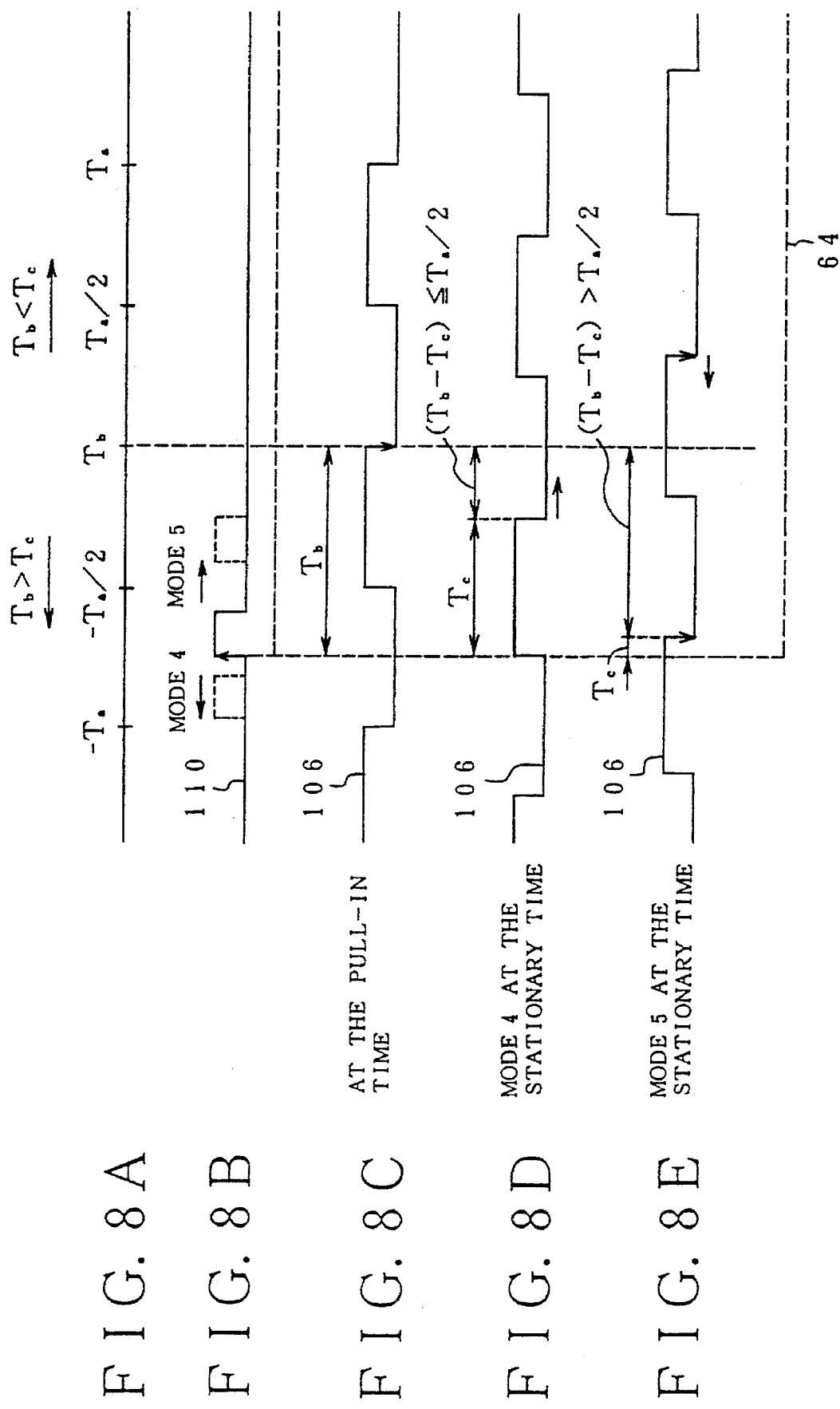

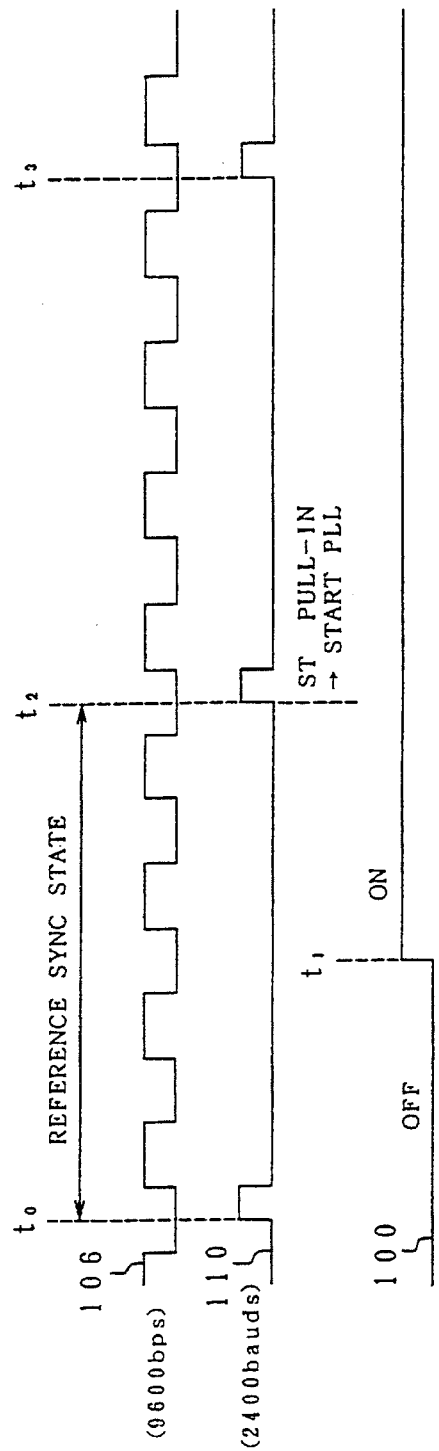

METHOD AND APPARATUS FOR SYNCHRONIZING MODEM TRANSMISSION BY CONTROLLING A MEASURED PHASE DIFFERENCE BETWEEN AN INTERNAL TIMING SIGNAL AND A TRANSMISSION TIMING SIGNAL

BACKGROUND OF THE INVENTION

The invention relates to transmission synchronizing apparatus and method of a modem for obtaining synchronization in the modem on the basis of a transmission timing signal which is given from a data terminal equipment and, more particularly, to transmission synchronizing apparatus and method to synchronize both of the modulating operation of a transmitting section and the demodulating operation of a receiving section by using the same internal timing signal.

When a frequency multiplex modem is used in a multipoint system (polling system) and a signal is transmitted synchronously with a transmission timing signal from the outside, the frequency multiplex modem of a master station obtains a transmission synchronization by synchronizing an internal timing signal of a baud rate for transmission with the transmission timing signal from the outside. Further, a reception synchronization is also obtained by the internal timing signal for transmission synchronization. Therefore, in order to synchronize the internal timing signal with the transmission timing signal, when a phase jump to coincide the phases of both of those signals is executed at the time of pull-in, there is a fear such that a reception data error is caused. Thus, it is necessary to use a new method of synchronization.

Hitherto, a multipoint system to execute a data transfer with a predetermined slave station by polling from the master station has been put into practical use in order to improve a use efficiency and a reliability of a line. The modem which is used in the multipoint system can synchronize the internal timing signal of the baud rate by the transmission timing signal from the outside with respect to the transmitting section. With regard to the receiving section, the internal timing signal of the baud rate is synchronized by extracting a timing signal from a carrier signal which was received.

The transmission timing signal from the outside is a timing signal of 2400 Hz, 4800 Hz, or 9600 Hz which is decided by a data transfer speed of 2400 bps, 4800 bps, or 9600 bps, or the like. The internal timing signal is a signal having a repetitive period (baud rate period $T_B$) which is decided by a modulation speed, for example, 2400 bauds.

With respect to the case of 9600 bps, a transmission timing signal 106 is shown in FIG. 1A. An internal timing signal 110 of the baud rate of 2400 bauds, which is synchronized by a PLL activation, is shown in FIG. 1B. Further, a transmission request signal 100 is shown in FIG. 1C. FIG. 1D shows an internal timing signal 110' which is not synchronized, for the purpose of comparison.

It is now assumed that a baud rate is set to 2400 bauds, and in order to obtain a data transfer speed of 9600 bps, 9600 bits/second÷2400 modulation/second=4 bits/1 modulation Therefore, the number of data signal points in a phase plane which is used for modulation is equal to 16.

In the conventional modem which dan independently obtain the synchronization between the internal timing signals of the transmitting section and the receiving section, the pull-in of the internal timing signal 110 to the transmission timing signal 106 is executed by a phase jump as shown in FIGS. 1A to 1D.

It is now assumed that the transmission timing signal 106 in FIG. 1A is not synchronized with the internal timing signal 110 in FIG. 1B, and that their phases are deviated. Such a phase deviation corresponds to a time $\Delta T$ from the leading edge at time $t_{12}$ of the internal timing signal 110' in FIG. 1D, as illustrated for comparison to the leading edge at time $t_2$ of the transmission timing signal 106 of FIG. 1A.

When the transmission request signal 100 in FIG. 1C is turned on from off at time $t_1$, the transmission timing signal 106 in FIG. 1A and the internal timing signal 110 in FIG. 1B are not synchronized at time $t_0$ before $t_1$. Therefore, the transmission internal timing signal 110 is phase jumped and pulled in so as to coincide with the leading edge of the transmission timing signal 106 at time $t_2$ after the transmission request signal 100 was turned on, and a PLL operation (phase locked loop operation) is started. The phase jump illustrated in FIGS. 1A–1D shows that the leading edge rising at time $t_{12}$ of the internal timing signal 110' in FIG. 1D jumps by $\Delta T$ and is synchronized by the PLL operation at time $t_2$, as shown in FIG. 1B. Therefore, the baud rate period of the internal timing signal 110 of FIG. 1B is initially increased by the out-of-synchronization amount $\Delta T$, thereby becoming a long baud rate period equal to $T_B+\Delta T$. As illustrated by FIG. 1B, in the next baud rate period, the baud rate period is returned to the correct baud rate period $T_B$ by the PLL operation.

On the other hand, in recent years, a frequency multiplex modem using a plurality of carriers of a small roll-off rate having different frequency bands is used for a multipoint system in order to improve a use efficiency of a network. When the frequency multiplex modem of a slave station receives a polling from the master station, a data multiplex transmission can be executed between a plurality of data terminal equipment connected to the slave station and a host computer of the master station.

In such a multipoint system using the frequency multiplex modem, it is difficult to extract a timing signal by a modem demodulating section of the terminal from the reception signal of the carrier of a small roll-off rate. Therefore, the master station modem always transmits a carrier to a secondary channel and the slave station modem extracts a reception timing signal from the carrier reception signal of the secondary channel and further uses the extracted reception timing signal as a transmission timing signal.

In the master station modem, since the system has a multipoint construction, it is not expected that a carrier by the secondary channel from the slave station side is always received. Therefore, both of the transmitting section and the receiving section of the modem are synchronized on the basis of the transmission timing signal from the host computer or the transmission timing signal in the modem, thereby obtaining a synchronization of the system.

In the master station of the frequency multiplex modem which is used for the multipoint system, however, the internal timing signal for transmission is synchronized with the transmission timing signal from the outside and at the same time a synchronization of the receiving section is obtained by using the internal timing signal for transmission, so that when a phase control by the PLL is executed by pulling in the transmission timing signal from the outside by a phase jump of the internal timing signal as in a conventional manner, such a phase control becomes a cause to generate a reception data error.

For example, in the sync pull-in by the phase jump shown in FIGS. 1A to 1D, a time interval from time $t_0$ to pull-in time $t_2$ is longer than the correct baud rate period $T_B$ (1/2400 second), which is illustrated in FIG. 1D for the internal timing signal 110'. Accordingly, a sampling period of an A/D converter is also longer. Therefore, a carrier cannot be reproduced accurately, an error occurs in the reconstructed reception data, and a reception data error occurs.

In the slave station, it is similarly considered by replacing the external transmission timing in the master station to the reception timing extracted from the carrier.

SUMMARY OF THE INVENTION

According to the invention, there are provided synchronization controlling apparatus and method of a modem, in which an internal timing signal which is used for both of a transmitting section and a receiving section is synchronized with a transmission timing signal from the outside without exerting any influences on a receiving process.

The modem as a target of the invention has a transmitting section for modulating transmission data from the outside and transmitting the modulated data to a line and a receiving section for demodulating a reception signal from the line and converting the demodulated signal into the reception data and outputting the converted data to the outside. When a transmission request is received from the outside, the modem synchronizes the internal timing signal of the baud rate with the transmission timing signal from the outside having a predetermined data transfer speed which is $2^n$ times as large as the baud rate and supplies to both of the transmitting section and the receiving section.

In such a transmission synchronizing apparatus of the modem in the invention, a phase difference from a change point of the internal timing signal to a change point of the transmission timing signal is detected as a reference phase difference Tb at the time of pull-in of the timing based on the transmission request from the outside. In a stationary communicating state after completion of the timing pull-in, a phase difference from the change point of the internal timing signal to the change point of the transmission timing signal ST is obtained as a measurement phase difference Tc. The apparatus is controlled so as to coincide the measured phase difference Tc with the reference phase difference Tb. The above control is executed in the phase control section.

The phase control section sets a sampling window including at least the transmission timing signal of two periods each time a change point of the internal timing signal is detected, thereby obtaining the reference phase difference Tb and the measured phase difference Tc from a change point of the transmission timing signal ST in the sampling window.

The phase control section also judges a data transfer speed of the modem of 2400 bps, 4800 bps, 9600 bps, or the like which has been predetermined from the period of the transmission timing signal, obtains a corresponding theoretical period Ta, and controls the internal timing signal on the basis of the theoretical period Ta, the reference phase difference Tb, and the measured phase difference Tc obtained in the stationary communicating state.

Further, the phase control section decides that a phase jitter occured in the transmission timing signal ST when the reference phase difference Tb obtained by the setting of the sampling window is longer than the theoretical period Ta, so that the reference phase difference Tb is corrected to the value (Tb−Ta) which is obtained by subtracting the theoretical period Ta from the reference phase difference Tb. The control of the internal timing signal by the phase control section is executed as follows.

Mode 1

When the reference phase difference Tb is equal to the measured phase difference Tc, the period (or frequency) of the internal timing signal is held to the present value.

Mode 2

When the reference phase difference Tb is smaller than the measured phase difference Tc (Tb<Tc) and the difference (Tc−Tb) between them is equal to or less than the half period Ta/2 of the theoretical period of the transmission timing signal ST (Tc−Tb≦Ta/2), the period of the internal timing signal is extended (or the frequency is decreased), thereby holding the phase difference with the transmission timing signal to the reference phase difference Tb.

Mode 3

When the reference phase difference Tb is smaller than the measurement phase difference Tc (Tb<Tc) and the difference (Tc−Tb) between them is larger than the half period Ta/2 of the theoretical period of the transmission timing signal ST (Tc−Tb>Ta/2), the period of the internal timing signal is reduced (the frequency is increased) and the phase difference with the transmission timing signal is held to the reference phase difference Tb.

Mode 4

When the reference phase difference Tb is larger than the measured phase difference Tc (Tb>Tc) and the difference (Tb−Tc) between them is equal to or less than the half period (Ta/2) of the theoretical period of the transmission timing signal (Tb−Tc≦Ta/2), the period of the internal timing signal is reduced (the frequency is increased) and the phase difference with the transmission timing signal is held to the reference phase difference Tb.

Mode 5

When the reference phase difference Tb is larger than the measurement phase difference Tc (Tb>Tc) and the difference (Tb−Tc) between them is larger than the half period (Ta/2) of the theoretical period of the transmission timing signal (Tb−Tc≦Ta/2), the period of the internal timing signal is extended and the phase difference with the transmission timing signal is held to the reference phase difference Tb.

The above modes are summarized as follows.

| [Mode] | [Conditions] | [Period] | [Frequency] |
|---|---|---|---|
| 1 | Tb = Tc | unchanged | unchanged |
| 2 | Tb < Tc, Tc − Tb ≦ Ta/2 | extended | decreased |
| 3 | Tb < Tc, Tc − Tb > Ta/2 | reduced | increased |
| 4 | Tb > Tc, Tb − Tc ≦ Ta/2 | reduced | increased |
| 5 | Tb > Tc, Tb − Tc > Ta/2 | extended | decreased |

The sync input section comprises: a change point detecting section to detect a change point of the transmission timing signal; a timer section to output time information; and a register section for holding an output value of the timer section when the change point from the change point detecting section is obtained and for outputting the output value to the phase control section as change point information.

Further, a sync output section comprises: a register section to set either one of the states of two values of the internal timing signal obtained by the phase control section and the output time; a timer section to output time information; and an output section to output the state of the internal timing signal when the present time of the timer section coincides with the output time held in the register section.

The sync input section, sync output section, and phase control section of the invention are provided in the frequency multiplex modem of the master station of the multipoint system, and are also provided in the frequency multiplex modem of the slave station of the multipoint system.

According to the transmission synchronizing apparatus of the modem of the invention, at the pull-in time upon reception of the transmission request, for example, the apparatus detects a leading edge of the internal timing signal as a change point. The phase difference from the change point to a change point at which the transmission timing signal, for example, trails is detected as a reference phase difference Tb between the internal timing signal and the transmission timing signal ST.

In a stationary communicating state in which the training has been finished after the pull-in of the timing, the phase difference Tc of the internal timing signal and the transmission timing signal is measured, and the period or frequency of the internal timing signal is controlled so that the measured phase difference Tc is equal to the reference phase difference Tb detected at the time of the pull-in of the timing.

Due to this, a phase jump to forcedly coincide the change point of the internal timing signal with the change point of the transmission timing signal as in the conventional manner is not executed at the time of pull-in of the timing. Even at the time of the timing pull-in, there is no change in repeating period of the internal timing signal, a demodulating period in the receiving section which simultaneously obtains a synchronization by the same internal timing signal is not changed, and no error occurs in the reception data. Therefore, the synchronization control in the frequency multiplex modem of the multipoint system can be properly executed and a reliability of the data transmission can be guaranteed.

The above and other objects, features, and advantages of the present invention will become more apparent from the following detailed description with reference to the drawings.

BRIEF DESCRIPTION OF THE DRAWINGS

FIGS. 6A to 6C are timing charts showing the detection of a reference phase difference in case where there is a jitter in a transmission timing signal;

FIGS. 7A to 7E are timing charts showing a synchronization control in a stationary communicating state according to the invention with respect to modes 2 and 3;

FIGS. 8A to 8E are timing charts showing a synchronization control in a stationary communicating state according to the invention with respect to modes 4 and 5;

FIGS. 9A to 9C are timing charts showing a synchronization control according to the invention;

DETAILED DESCRIPTION OF THE PREFERRED EMBODIMENT

Figure 1:
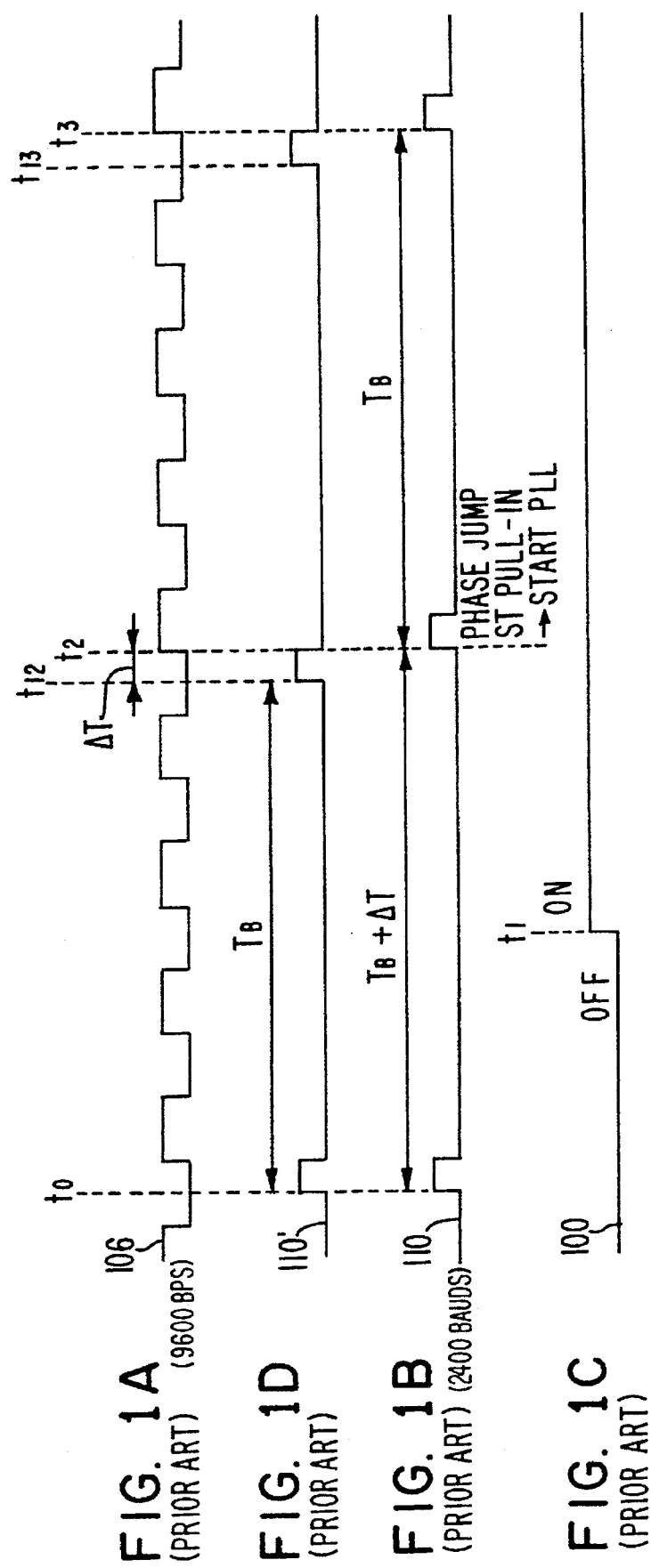
FIGS. 1A to 1D are timing charts showing a conventional synchronization control by a phase jump.
Figure 2:
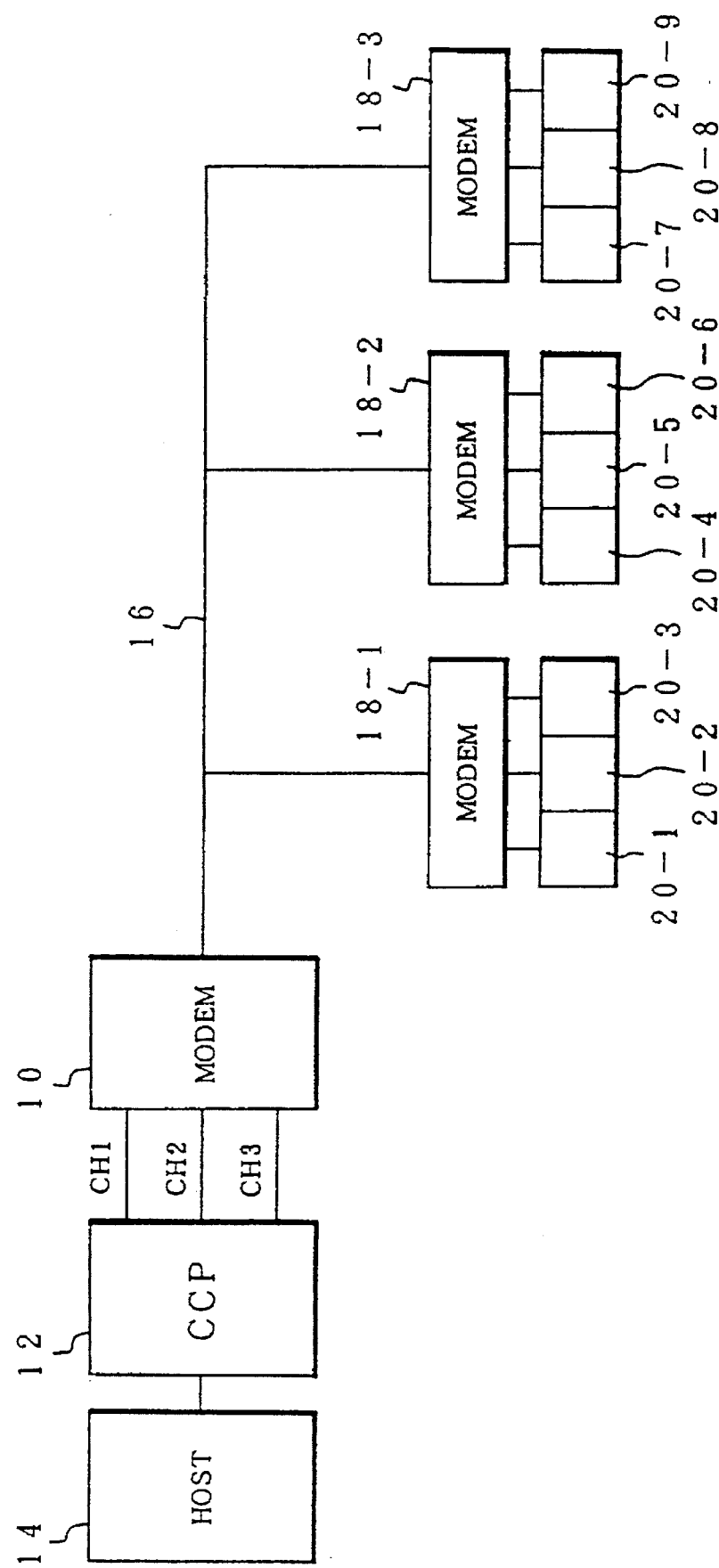
FIG. 2 is a block diagram of a multipoint system using a frequency multiplex modem to which the invention is applied.

FIG. 2 shows a multipoint system using a frequency multiplex modem to which a transmission synchronizing apparatus of the invention is applied. A host 14 is connected to a master station modem 10 through a communication control processor 12. Data lines of three channels are connected from the communication control processor 12 and the master station modem 10 executes data transmission by frequency multiplex using three carrier frequencies f1, f2, and f3. A communication line 16 is pulled out from the modem 10. In the embodiment, three slave station modems 18-1, 18-2, and 18-3 are connected to the communication line 16, thereby constructing a multipoint system. A full duplex of the four-line type is used as a communication line 16.

Each of the slave station modems 18-1 to 18-3 is, for example, a frequency multiplex modem of, for example, up to three multiplexes. Every three data terminal equipment 20-1 to 20-3, 20-4 to 20-6 and 20-7 to 20-9 are connected to data lines of 3 channels pulled out respectively from the modems 18-1 to 18-3.

Figure 3:
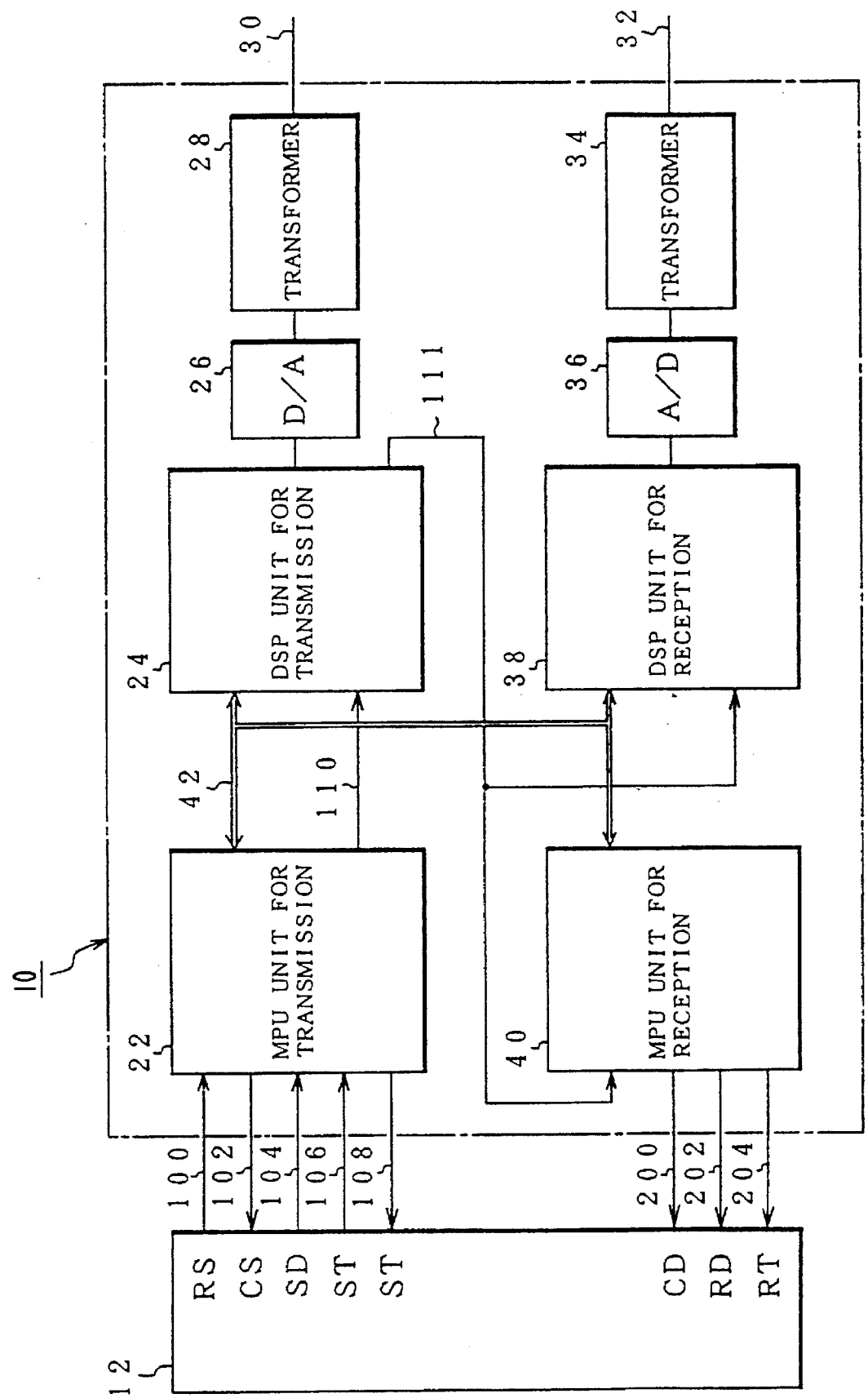
FIG. 3 is a block diagram of a modem to which the invention is applied.

FIG. 3 shows an embodiment of the master station modem in FIG. 2 with respect to one channel. An MPU unit 22 for transmission, a digital signal processor unit 24 for transmission, a D/A converter 26, and a transformer 28 are provided as a modem transmitting section of the master station modem 10. A transmission line 30 is connected to the transformer 28. The MPU unit 22 for transmission is connected to the CCP 12. The MPU unit 22 receives the transmission request signal 100, transmission data 104, and further the transmission timing signal 106 from the communication control processor 12 and generates a timing signal 108. On the other hand, the MPU unit 22 returns a clear to send 102 to the communication control processor 12.

The transmission timing signal 106 from the communication control processor 12 is determined by a data transfer speed of the communication control processor 12 and is supplied to the MPU unit 22 for transmission. As a data speed of the communication control processor 12, for example, there is 2400 bps, 4800 bps, or 9600 bps. The following description relates to an example of the case where the timing signal 106 of a data transfer speed of 9600 bps is set and sent from the communication control processor 12.

As a microprocessor which is used in the MPU unit 22 for transmission and an MPU unit 40 for reception, for example, an MCS-96 which is an MPU made by Intel Co., Ltd. is used. The MPU unit 22 for transmission and the digital signal processor unit 24 for transmission are connected by a data bus 42. Further, the MPU unit 40 for reception and a digital signal processor unit 38 for reception are also connected by the same data bus 42.

Further, a transmission synchronizing mechanism of the invention, which will be made apparent by a description later, is provided for the MPU unit 22 for transmission. The internal timing signal 110 having a baud rate of 2400 bauds produced by the transmission synchronizing mechanism is outputted through a control line to the digital signal processor unit 24 for transmission. Further, a jitter in the internal timing signal 110 is suppressed by the digital signal processor unit 24 for transmission and 94 internal timing signal 111 is supplied to the digital signal processor unit 38 for reception and the MPU unit 40 for reception provided in the modem receiving section. Accordingly the operations of the modem transmitting section and the modem receiving section are executed by the same internal timing signals 110 and 111 for transmission.

Figure 4:
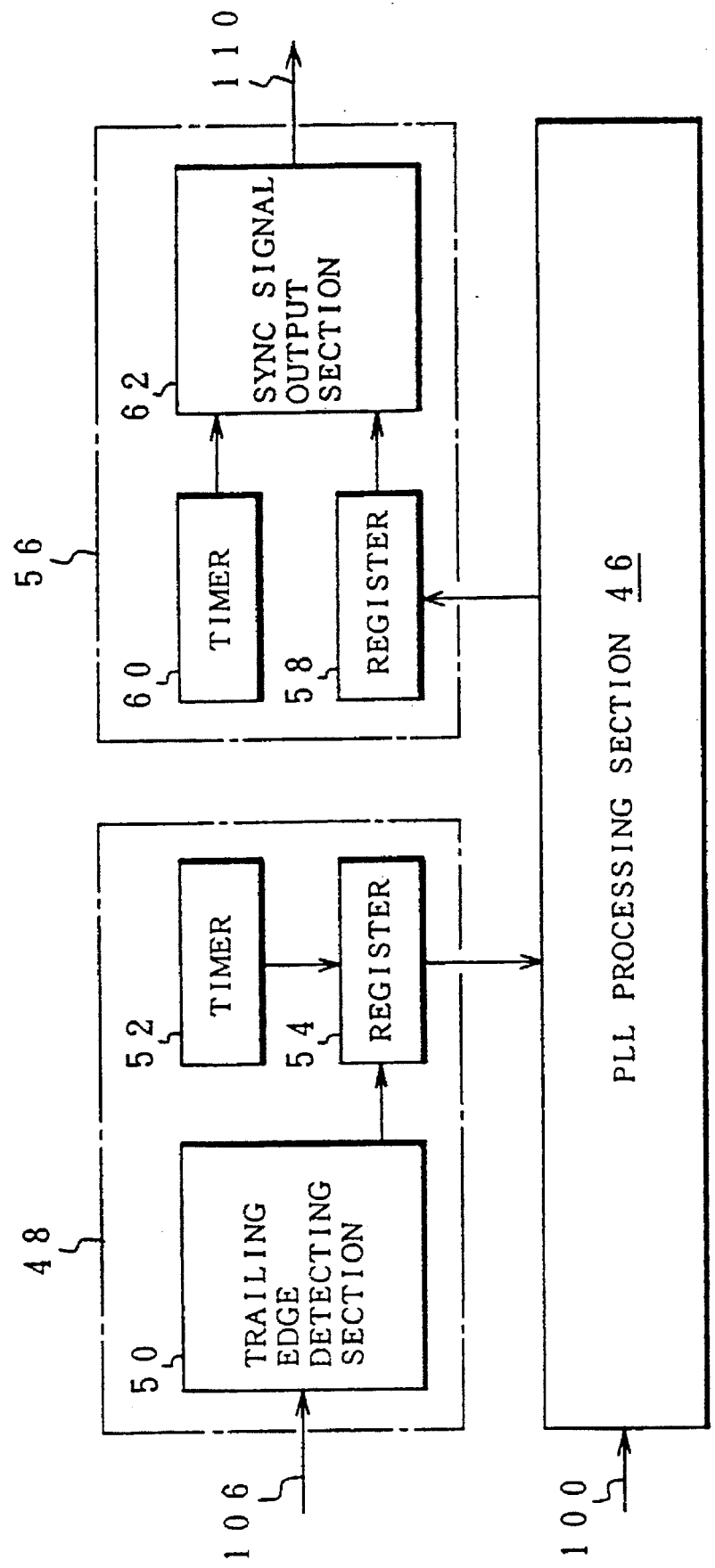
FIG. 4 is a block diagram showing an embodiment of the invention.

FIG. 4 shows an embodiment of the transmission synchronizing mechanism of the invention which is realized by the MPU unit 22 for transmission in FIG. 3. The transmission synchronizing mechanism of the invention comprises: a sync input section 48; a PLL processing section 46 which operates as a phase control section; and an internal sync output section 56. The sync input section 48 has: a trailing edge detecting section 50 to detect a trailing edge of the transmission timing signal 106 from the outside; a timer 52 to generate time information; and a register 54 to hold time of the timer 52 when a detection output of the trailing edge detecting section 50 is obtained. The function of the sync input section 48 is realized by using a high speed input function of the MCS-96 which is an MPU of Intel Co., Ltd. and is used for the MPU unit for transmission in FIG. 3. The PLL processing section 46 is activated upon reception of a transmission request signal (RS) 100 from the outside and first detects a phase difference at a change point, for example, a rising edge of the internal timing signal 110 at the timing of a trailing edge detection of the transmission timing signal 106 just after the transmission request RS 100 and sets the phase difference to a reference phase difference Tb.

When the transmission request signal 100 is received, the modem transmitting section first sends a training signal, thereby allowing the modem receiving section on the partner side to execute a training operation. After completion of the training, the modem transmitting section enters a stationary communicating state to send a telegraphic message. In the stationary communicating state after completion of the training, the PLL processing section 46 obtains a phase difference with the internal timing signal 110 as a measured phase difference Tc every time a trailing edge of the transmission timing signal 106 from the outside is detected. The PLL processing section 46 controls so as to coincide the measured phase difference with the reference phase difference Tb detected at the time of pull-in of the timing. Namely, the repeating period of the internal timing signal 110 is controlled so as to hold the phase relation between the transmission timing signal 106 and the internal timing signal 110 at the time of pull-in of the timing.

The internal sync output section 56 comprises a register 58, a timing 60, and a sync signal output section 62. The output time of the internal timing signal 110 is obtained by the PLL processing section 46 and the signal state of 0 or 1 are set into the register 58. When the time set in the register 58 coincides with the time which is generated from the timer 60, the sync signal output section 62 generates a signal state 1 or 0 which has been set in the register 58 at that time and such a signal state becomes an output of the internal timing signal 110. The repeating period of the internal timing signal 110 can be freely varied by increasing or decreasing the time that is set into the register 58.

Such an internal sync output section 56 can be easily realized by using the high speed output function (HSO) of the MCS-96 which is an MPU of Intel Co., Ltd. which is used as an MPU unit 22 for transmission in FIG. 3.

The details of the phase control of the internal timing signal 110 of the invention will now be described by the PLL processing section 46 shown in FIG. 4.

Figures 5A, 5B:
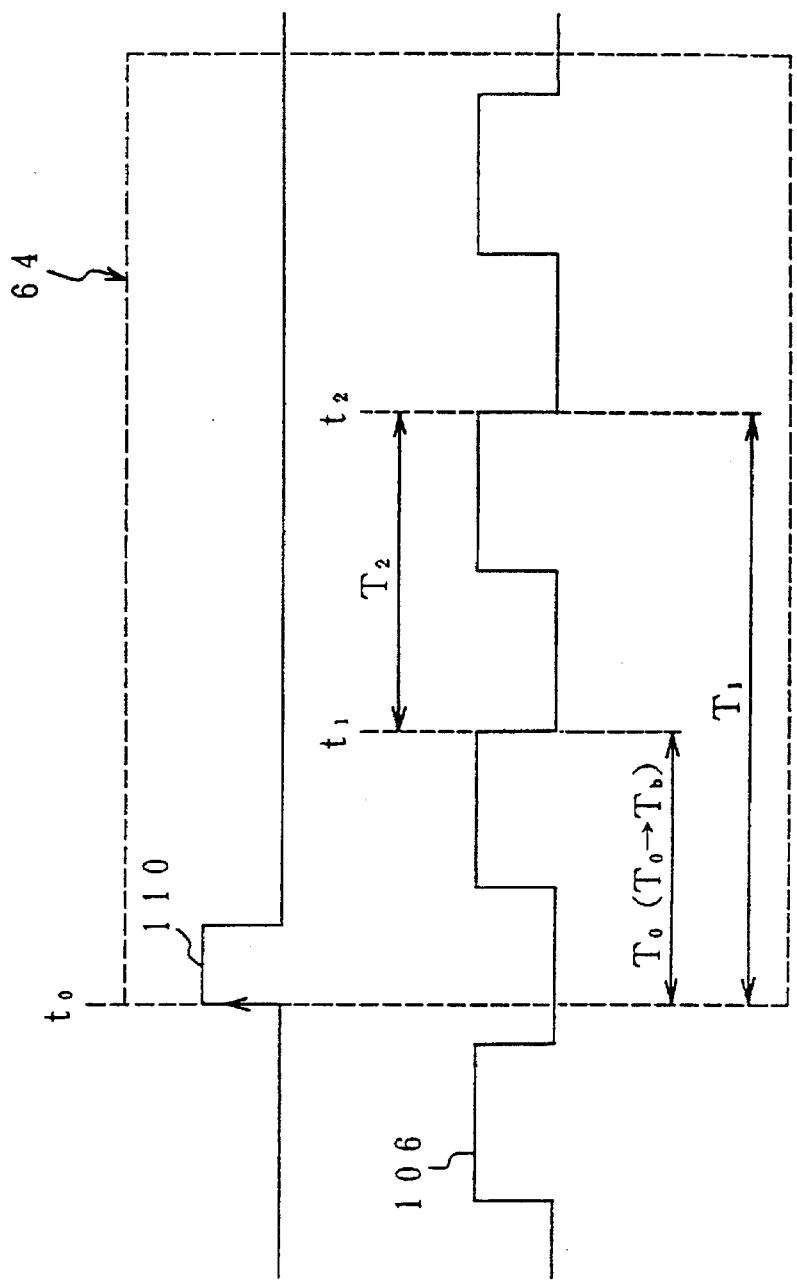
FIGS. 5A and 5B are timing charts showing the detection of a reference phase difference at the time of pull-in of the timing of the invention.

FIGS. 5A and 5B are timing charts of the internal timing signal 110 and the transmission timing signal 106 and show a detection principle of the reference phase difference Tb at the time of pull-in of the timing when the transmission request signal from the outside is turned on. When the internal timing signal 110 rises at time $t_0$ after the transmission request signal was turned on, the leading edge is detected by the sync input section 48. The time $t_0$ from the timer 52 is held in the register 54 and is notified to the PLL processing section 46. The PLL processing section 46 which received a notification of the leading edge detection of the internal timing signal 110 sets a sampling window 64 having a predetermined time limit, while setting time $t_0$ into a starting point.

The size in the time base direction of the sampling window 64 is set to a size such that the slowest transmission timing signal 106, namely, the transmission timing signal 106 of a data transfer speed of 2400 bps can be fetched by an amount of at least two periods. Although the leading time $t_0$ of the internal timing signal 110 and the set time of the window 64 have been made to coincide in the case of FIGS. 5A and 5B, it is not always necessary to coincide them. It is sufficient that the sampling window 64 can be set in a predetermined time from the leading edge time $t_0$.

When the sampling window 64 is set for the transmission timing signal 106, the first trailing edge time $t_1$ and the next trailing edge time $t_2$ are detected by using the time of the timer. Subsequently, the phase difference $T_0$ is obtained from the difference between the leading edge time $t_0$ of the internal timing signal 110 and the first trailing edge time $t_1$ in the window of the transmission timing signal 106.

$$T_0 = t_1 - t_0$$

And from the leading time $t_0$ of the internal timing signal 110 and the second trailing time $t_2$ of the second transmission timing signal 106 in the window, the following equation is obtained.

$$T_1 = t_2 - t_0$$

The period $T_2$ of the transmission timing signal 106 from the trailing edge time $t_1$ to the trailing edge time $t_2$ in the sampling window 64 is obtained as follows.

$$T_2 = t_1 - t_0$$

When the period $T_2$ of the transmission timing signal 106 is obtained as mentioned above, with respect to a speed of the transmission timing signal 106 which is input from the outside, since several kinds of speeds such as 2400 bps, 4800 bps, and 9600 bps which can be used in the modem have been predetermined, the speed of the transmission timing signal 106 corresponding to the period $T_2$ detected is determined. After the speed of the transmission timing signal 106 could be selected as mentioned above, a theoretical period (timer value) of one period corresponding to the selected speed is chosen from among the values of the theoretical period Ta which have been predetermined.

Finally, the time difference $T_0$ from the rising time $t_0$ of the internal timing signal 110 to the first trailing time $t_1$ of the transmission timing signal 106 in the window is replaced to the reference phase difference Tb and the processes at the time of pull-in of the timing.

FIG. 6A shows the internal timing signal 110. FIG. 6B shows the case where a jitter occurred in the transmission timing signal 106 at the time of pull-in of the timing. Further, FIG. 6C shows the transmission timing signal 106 in case of no jitter.

Now, assuming that a jitter occurred in the transmission timing signal 106 in FIG. 6B at the leading time $t_0$ of the internal timing signal 110 in FIG. 6A after the transmission request signal had been turned on, the phase difference $T_0$ is increased by an amount of only the jitter. Therefore, $T_0$ is compared with the theoretical period Ta of a predetermined data transfer speed decided on the basis of the period $T_2$ after obtaining the phase difference $T_0$. When $$T_0 > Ta$$

it is decided that a jitter occurred in the transmission timing signal 106 upon setting of the window. The value $(T_0-T_a)$ which is obtained by subtracting the theoretical period $T_a$ from the phase difference $T_0$ is set to the phase difference $T_0$ and $T_0$ is finally replaced to the reference phase difference Tb.

FIGS. 7A to 7C and 8A to 8C show the phase control of the internal timing signal in a stationary communicating state after completion of the training. That is, FIGS. 7A and 8A show scales of the time difference, FIGS. 7B and 8B show the internal timing signals 110, FIGS. 7C and 8C show the transmission timing signals 106 at the time of pull-in, and FIGS. 7D, 7E, 8D and 8E show the transmission timing signals 106 in the modes 2 to 5.

With respect to the scale displays of FIGS. 7A and 8A, the first trailing edge position of the transmission timing signal 106 at which the reference phase difference Tb of the transmission timing signal 106 at the time of pull-in of the timing in FIGS. 7B and 8B was obtained is shown as an origin Tb. The right side shows the case where the difference (Tc–Tb) between the measured phase difference Tc and the reference phase difference Tb is positive (+) for the origin Tb. The left side shows the case where it is negative (–). The values are plotted on the axis of coordinates in which the reference phase difference Tb is set to the relative origin on the basis of the theoretical period.

The phase control of the invention is classified into the following five modes 1 to 5 by the relations among the reference phase difference Tb at the time of pull-in of the timing of the internal timing signal 110 and the transmission timing signal 106, the measured phase difference Tc in the stationary communicating state, and the theoretical period Ta obtained at the time of pull-in of the timing.

Mode 1

Mode 1 relates to the case where the reference phase difference Tb and the measured phase difference Tc are equal (Tb=Tc). In this case, since the phase relation at the time of pull-in of the timing is maintained in the stationary communicating state, the internal timing signal 110 is held to the current value.

Mode 2

Mode 2 relates to the case where the measured phase difference Tc by the first trailing edge of the transmission timing signal 106 in FIG. 7D in the sampling window 64 is bigger than the reference phase difference Tb at the time of pull-in of the timing in FIG. 7C for the trailing time of the internal timing signal 110 in FIG. 7B. That is, the mode 2 in the stationary state in FIG. 7D relates to the case where the difference (Tc–Tb) between the measured phase difference Tc and the reference phase difference Tb is positive (+) and the theoretical period Ta is equal to or less than the half value Ta/2.

With respect to mode 2 in FIG. 7D, in order to maintain the same phase relation for the internal timing signal 110 of the transmission timing signal 106 as that at the time of pull-in of the timing in FIG. 7C, it is sufficient to extend the next leading edge of the internal timing signal 110 by only an arbitrary time on the time base and to increase the repeating period. Therefore, in case of the mode 2, it is controlled so as to shorten the repeating period of the internal timing signal 110 as shown by a broken line in FIG. 7B. This means that the frequency of the internal timing signal 110 is reduced.

Mode 3

Mode 3 relates to the case shown in FIG. 7E. Although the difference (Tc–Tb) between the measured phase difference Tc and the reference phase difference Tb is positive, in a manner similar to the case of the mode 2 in FIG. 7D, it is larger than Ta/2. It is now assumed that a jitter exceeding 50% does not occur in the transmission timing signal 106, the state of the mode 3 relates to the case where the trailing edge of the transmission timing signal 106 which should inherently lie within the sampling window 64 comes before the window 64. That is, it is the case where the period of the internal timing signal 110 is too large. Therefore, in case of the mode 3, it is controlled so as to shorten the repeating period of the internal timing signal 110 as shown by a broken line in FIG. 7B. This means that the frequency of the internal timing signal 110 is increased.

Mode 4

Mode 4 relates to the state shown in FIG. 8D. In this case, the measured phase difference Tc is smaller than the reference phase difference Tb. Accordingly, the value (Tc–Tb) which is obtained by subtracting the reference phase difference Tb from the measured phase difference Tc is negative (–). Mode 4 relates to the case where the value of (Tc–Tb) is equal to or larger than –Ta/2.

Mode 4 relates to the case where the period of the internal timing signal 110 in FIG. 8B is longer than the reference phase difference Tb at the time of pull-in of the timing in FIG. 8C. Therefore, as shown by a broken line in FIG. 8B, it is controlled so as to shorten the period of the internal timing signal 110. This means that the frequency of the internal timing signal 110 is increased.

Mode 5

Mode 5 relates to the case where the measured phase difference Tc is smaller than the reference phase difference Tb as shown in FIG. 8E in a manner similar to the case of the mode 4. In this case, the value (Tc–Tb) which is obtained by subtracting the reference phase difference Tb from the measured phase difference Tc is negative (–). Different from the mode 4, the value is smaller than –Ta/2. Mode 5 relates to the case where the repeating period of the internal timing signal 110 becomes too short and the trailing edge which is one-edge preceding to the leading edge of the transmission timing signal 106 which should inherently entered the sampling window 64. In the mode 5, it is controlled so as to extend the period of the internal timing signal 110 as shown by the broken line in FIG. 8A. That is, it is controlled so as to decrease the frequency of the internal timing signal 110. In case of the mode 5, it is also assumed as a prerequisite that a jitter over 50% does not occur in the transmission timing signal 106.

FIGS. 9A to 9C show the transmission timing signal 106, internal timing signal 110, and transmission request signal 110 in a pull-in state of the timing in the transmission synchronization according to the invention. When the transmission request signal 100 is turned on at time $t_1$, what is called a timing pull-in in which the reference phase Tb is obtained at the first leading edge of the internal timing signal 110 for transmission at time $t_2$ is executed. That is, the phase relation of the transmission timing signal 106 for one period of the internal timing signal 110 until time $t_0$ which is one-period preceding to time $t_2$ is determined as a target value of the synchronization control. With respect to time $t_2$ and subsequent times, the repeating period of the timing signal 110 is increased or decreased so that the reference synchronizing state in time $t_0$ to $t_2$ is maintained.

Figure 10:
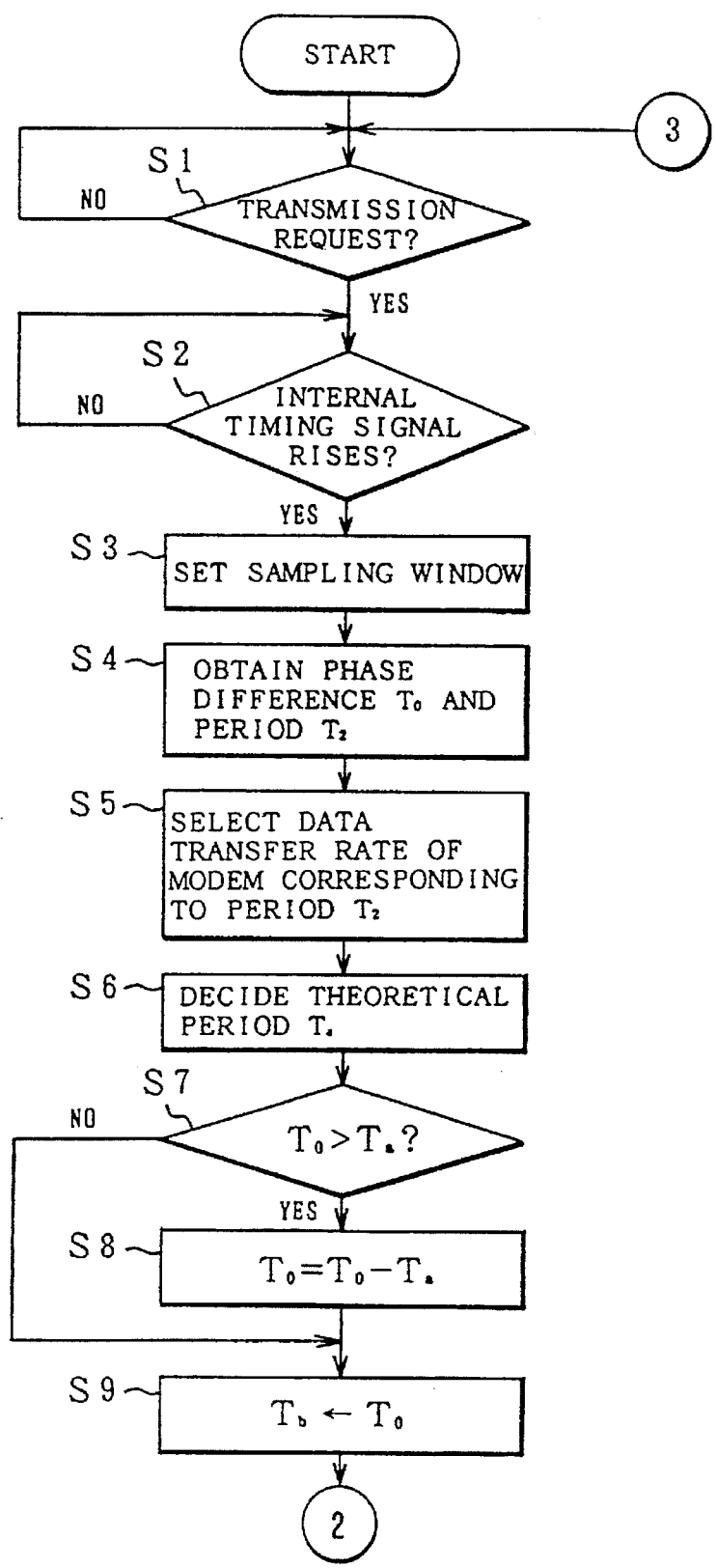
FIG. 10 is a flowchart showing the synchronization control of the invention.
Figure 11:
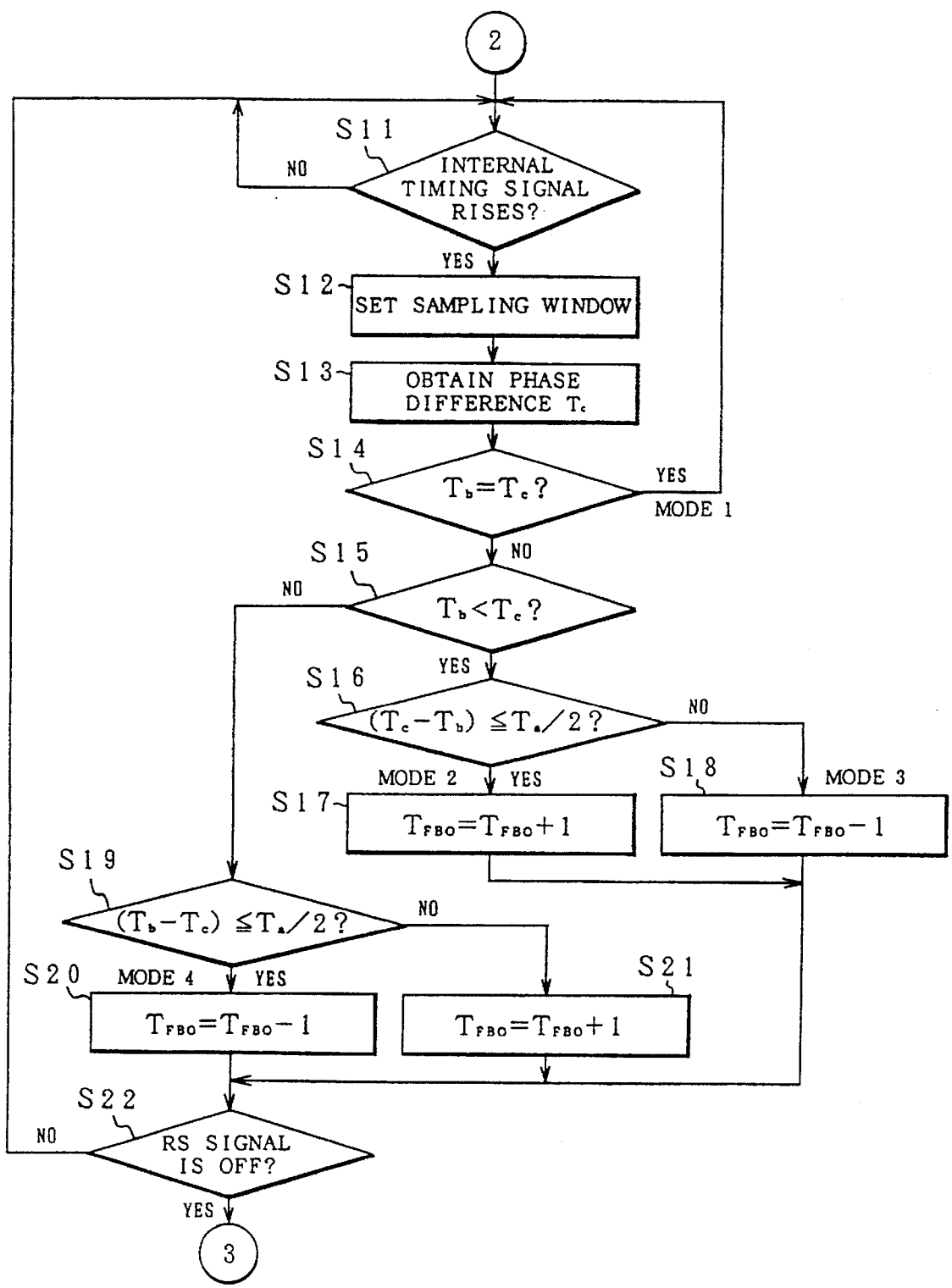
FIG. 11 is a flowchart showing the synchronization control of the invention subsequent to the FIG. 10.

Flowcharts of FIGS. 10 and 11 show the details of the transmission synchronization control of the invention which is realized by the program control of the MPU unit 22 for transmission shown in FIG. 3.

In FIG. 10, first in step S1, a check is made to see if there is the transmission request signal 100 from the outside or not, namely, if the signal is on or not. When the transmission request signal 100 is turned on, step S2 follows and a leading edge of the internal timing signal 110 is detected. Subsequently, a sampling window is set in step S3 and the phase difference $T_0$ and the period $T_2$ are obtained as shown in FIG. 5. In step S5, a data transfer speed corresponding to the period $T_2$ is selected. In step S6, the theoretical period Ta is determined. In order to judge a phase jitter of the transmission timing signal ST as shown in FIG. 6, the phase difference $T_0$ and the theoretical period $T_a$ are compared. When the phase difference $T_0$ is larger than the theoretical period Ta, it is judged that there is a jitter. In step S8, the phase difference value $T_0$ is replaced to the value of ($T_0$–Ta). The process in step S8 is not executed when there is no jitter. Subsequently, the phase difference $T_0$ which has already been measured is replaced to the reference phase difference Tb in step S9.

After completion of the pull-in, step S11 in FIG. 11 follows and the control in the stationary communicating state starts. A rising edge of the internal timing signal 110 is detected in step S11. After a sampling window was set in step S12, the measured phase difference Tc is obtained in step S13. A check is now made whether the measured phase difference Tc is equal to the reference phase difference Tb or not in step S14. If YES, the period control of the internal timing signal 110 is not executed. If NO in step S14, step S15 follows and the values of the reference phase difference Tb and measurement phase difference Tc are compared. When the reference phase difference Tb is smaller than the measurement phase difference Tc, step S16 follows and the value of the difference (Tc–Tb) between them is compared with Ta/2. If the value is equal to or less than Ta/2 in step S16, it is determined that the mode is the mode 2, and step S17 follows. The period is extended by increasing the repeating period $T_{FBO}$ of the internal timing signal 110 by one. The value 1 which is added to $T_{FBO}$ denotes a unit time which is used to increase or decrease the period by one process. As for the unit time, a large value is used when raising a response speed and a small value is used when an accuracy is requested even if a response speed is slightly sacrificed. In any case, an arbitrary value that is equal to or longer than the minimum unit time which can be realized by the timer is used.

When (Tc–Tb) is larger than Ta/2 in step S16, the mode 3 is decided and step S18 follows and the period is shortened by decreasing the repeating period $T_{FBO}$ by one period. When the reference phase difference Tb is larger than the measured phase difference Tc in step S15, step S19 follows and the values of (Tb–Tc) and Ta/2 are compared. In this instance, when the value is Ta/2 or less, the mode 4 is decided and step S20 follows. The repeating period $T_{FBO}$ is decreased by one period, thereby shortening the period. If the value is larger than Ta/2 in step S19, mode 5 is determined. In step S21, the period $T_{FBO}$ is increased by one period, thereby extending the period. After completion of either one of the processes in steps S17, S18, S20, and S21, a check is made to see if the transmission request signal 100 is off or not in step S22. The processes are repeated from step S11 until the transmission request signal 100 is turned off.

In the embodiment of FIG. 3, although the master station modem shown in FIG. 2 has been described as an example, with respect to the slave station modems 18-1 to 18-3, a carrier always transmitted to the secondary channel from the master station modem 10. The slave station side detects a timing from the carrier of the secondary channel and supplies as a reception timing signal 204 to the data terminal equipment 20. Therefore, as transmission timing signal 106 for the MPU unit 22 for transmission, it is sufficient to supply the reception timing signal RT obtained from the MPU unit 40 for reception as it is.

In the embodiment of FIG. 3, the modem transmitting section and the modem receiving section use the different MPU units and digital signal processor units. It is also obviously possible to realize the functions as a modem transmitting section and a modem receiving section by one MPU unit and one digital processor unit.

Further, in the invention, although the example of the frequency multiplex modem which is used in the multipoint system has been described, the invention is not limited to such an example. The transmission synchronizing mechanism of the invention can be applied to a proper modem as it is so long as it obtains the synchronization on the reception side by using the internal timing signal for transmission.

According to the invention mentioned above, in the modem in which the transmitting section and the receiving section are synchronized with each other by the same internal timing signal, the pull-in can be executed without jumping the internal timing signal with respect to the pull-in for the transmission timing signal from the outside. Due to this, the repeating period of the internal timing signal is unchanged even the pull-in is executed in the transmitting section. Therefore, the generation of a reception data error in the receiving section can be certainly prevented. Since the synchronization with the internal timing signal is obtained by automatically judging a speed of the transmission timing signal from the outside, it is unnecessary to set a data transfer speed on the modem side, therefore the hardware to set the data transfer speed can be reduced.

Further, even when there is a jitter of maximum 50% in the transmission timing signal, the internal timing synchronization which traces the external timing signal can be maintained. The reliability of the synchronization control can be improved.

What is claimed is:

1. A relative synchronizing apparatus of a modem, the modem including a transmitting section and a receiving section and being responsive to a request to transmit and a transmission timing signal from an external device, the transmission timing signal having a predetermined data transfer speed, the relative synchronizing apparatus initially entering a pull-in state and then entering a stationary communicating state after the pull-in state, the relative synchronizing apparatus comprising:

sync input means for receiving the transmission timing signal and for producing a change point signal indicating change points of the transmission timing signal;

internal sync means for obtaining relative synchronization by producing an internal timing signal of a predetermined baud rate and supplying the internal timing signal to the transmitting section and the receiving section; and phase control means, responsive to detected change points of the internal timing signal and to a request to transmit, for receiving the change point signal from the sync input means, for detecting, during the pull-in state and upon the request to transmit, a phase difference from a first change point of the internal timing signal to a first change point of the transmission timing signal as a reference phase difference, for obtaining, in the stationary communicating state, a second phase difference from a subsequent, second change point of the internal timing signal to a second change point of the transmission timing signal as a measured phase difference, and for controlling the measured phase difference to coincide with the reference phase difference.

2. A relative synchronizing apparatus according to claim 1, wherein, for each detected change point of said internal timing signal, said phase control means sets a sampling window including at least two periods of said transmission timing signal and obtains said reference phase difference and said measured phase difference from change points of said transmission timing signal in said sampling window.

3. A relative synchronizing apparatus according to claim 1, wherein said phase control means judges a predetermined data transfer speed from a period of said transmission timing signal, obtains a corresponding theoretical period and controls said internal timing signal based on said theoretical period, said reference period, and said measured phase difference.

4. A relative synchronizing apparatus according to claim 3, wherein, when said reference phase difference is longer than said theoretical period, said phase control means determines that a phase jitter occurred in said transmission timing signal, and corrects said reference phase difference to a value obtained by subtracting said theoretical period from said reference phase difference.

5. A relative synchronizing apparatus according to claim 1, wherein said sync input means comprises:

change point detecting means for detecting change points of said transmission timing signal;

timer means for counting time and producing a corresponding output value; and a register which receives and holds the output value of said timer means when a respective change point is detected by said change point detecting means and which provides the output value to said phase control means.

6. A relative synchronizing apparatus according to claim 1, wherein said internal sync means comprises:

a register for storing a binary state of said internal timing signal obtained by said phase control means and a corresponding output time of the internal timing signal in the binary state;

timer means for counting time and producing a corresponding output value; and output means for receiving the output value from the timer means and for causing the register to output the binary state of the internal timing signal when the output value of said timer means coincides with the corresponding output time stored in said register.

7. A relative synchronizing method of a modem, the modem including a transmitting section and a receiving section and being responsive to a request to transmit and a transmission timing signal from an external device, the transmission timing signal having a predetermined data transfer speed, the relative synchronizing method initially entering a pull-in state and then entering a stationary communicating state after the pull-in state, the relative synchronizing method comprising:

a sync input step of receiving the transmission timing signal and producing a change point signal indicating change points of the transmission timing signal;

an internal synchronizing step of obtaining relative synchronization by producing an internal timing signal of a predetermined baud rate and supplying the internal timing signal to the transmitting section and the receiving section; and a phase control step of
detecting, during the pull-in state and upon the request to transmit, a phase difference from a first change point of the internal timing signal to a first change point of the transmission timing signal as a reference phase difference, obtaining, in the stationary communicating state, a second phase difference from a subsequent, second change point of the internal timing signal to a second change point of the transmission timing signal as a measured phase difference, and controlling the measured phase difference to coincide with the reference phase difference.

8. A relative synchronizing method according to claim 7, wherein said phase control step further comprises:

setting, for each detected change point of the internal timing signal, a sampling window including at least two periods of said transmission timing signal, and obtaining said reference phase difference and said measured phase difference from change points of said transmission timing signal in said sampling window.

9. A relative synchronizing method according to claim 7, wherein said phase control step further comprises:

judging the predetermined data transfer speed from the period of said transmission timing signal, obtaining a corresponding theoretical period, and controlling said internal timing signal based on said theoretical period, said reference point, and said measured phase difference.

10. A relative synchronizing method according to claim 9, wherein said phase control step further comprises:

determining, when said reference phase difference is longer than said theoretical period, that a phase jitter occurred in said transmission timing signal, and correcting said reference phase difference to a value which is obtained by subtracting said theoretical period from said reference phase difference.

11. A relative synchronizing method according to claim 7, wherein said sync input step further comprises, for each of the change points:

counting time to the detection of the change point of said transmission timing signal, storing the counted time, and producing the stored counted time as an output value when the change point is detected.

12. A relative synchronizing method according to claim 7, wherein said internal synchronizing step further comprises:

storing a binary state of said internal timing signal obtained in said phase control step and a corresponding output time of the internal timing signal in each state; and producing a signal state of the internal timing signal as an output when a present time coincides with the stored output time.

13. A relative synchronizing method for a modem, comprising:

producing a change point signal indicating change points of a transmission timing signal;

producing an internal timing signal;

detecting, upon receipt of a request to transmit, a phase difference from a first change point of the internal timing signal to a first change point of the transmission timing signal as a reference phase difference;

obtaining, in a stationary communicating state, a second phase difference from a subsequent, second change point of the internal timing signal to a subsequent, second change point of the transmission timing signal as a measured phase difference;

controlling the measured phase difference to coincide with the reference phase difference.

* * * * *